United States Patent [19]

Song

[11] Patent Number: 4,779,771
[45] Date of Patent: Oct. 25, 1988

[54] PARTITIONED BOX FOR POURING A MEASURED AMOUNT OF A GRANULATED SOLID

[76] Inventor: Won I. Song, 8081 9th Street, Room 204, Buena Park, Calif. 90621

[21] Appl. No.: 901,307

[22] Filed: Aug. 28, 1986

Related U.S. Application Data

[63] Continuation-in-part of Ser. No. 851,735, Sep. 14, 1986, Pat. No. 4,667,857.

[51] Int. Cl.$^4$ .............................................. G01F 11/26
[52] U.S. Cl. .................................... 222/456; 222/564; 222/548
[58] Field of Search ............... 222/454, 456, 564, 547, 222/452, 464, 548, 566; 229/17 R

[56] References Cited

U.S. PATENT DOCUMENTS

| | | | |
|---|---|---|---|
| 1,155,323 | 9/1915 | McBroom | 222/456 |
| 2,022,031 | 11/1935 | Fisher | 222/456 |
| 2,665,036 | 1/1954 | Riva | 222/456 |
| 2,799,436 | 7/1957 | Bernhardt | 222/454 |
| 3,298,576 | 1/1967 | Sellors | 222/456 |

FOREIGN PATENT DOCUMENTS

| | | | |
|---|---|---|---|
| 2120782 | 9/1967 | Fed. Rep. of Germany | 222/454 |
| 526716 | 9/1940 | United Kingdom | 222/456 |
| 746079 | 3/1956 | United Kingdom | 222/456 |

Primary Examiner—Joseph J. Rolla
Assistant Examiner—Kenneth Noland
Attorney, Agent, or Firm—Edgar W. Averill, Jr.

[57] ABSTRACT

An improved partitioned box for pouring a measured amount of a granulated solid. The box has a series of ascending vertical partitions extending from the bottom of the box toward a pouring channel. A raised partition is formed in the bottom of the box to effectively raise the level of the granulated solid when the box is almost empty. In a preferred configuration, a tube is placed in the pouring channel to prevent granulated solid from entering the channel before the first amount of granulated solid is poured from the box to prevent an overpour.

4 Claims, 2 Drawing Sheets

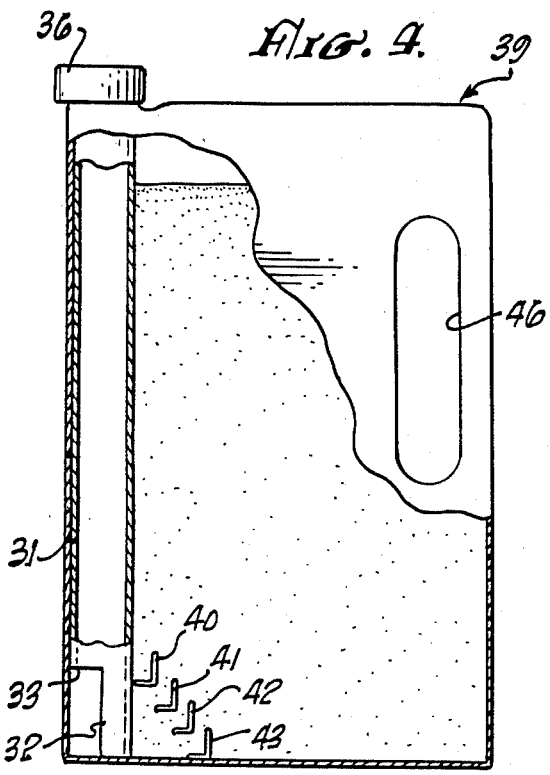
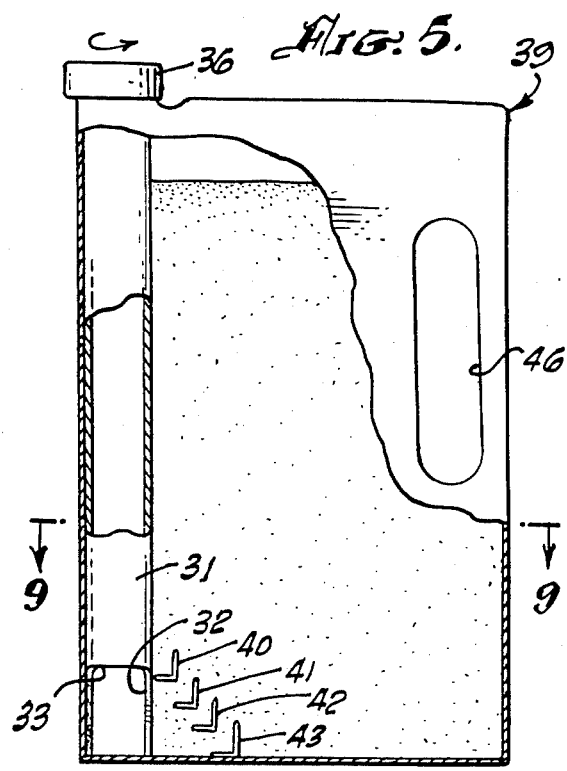
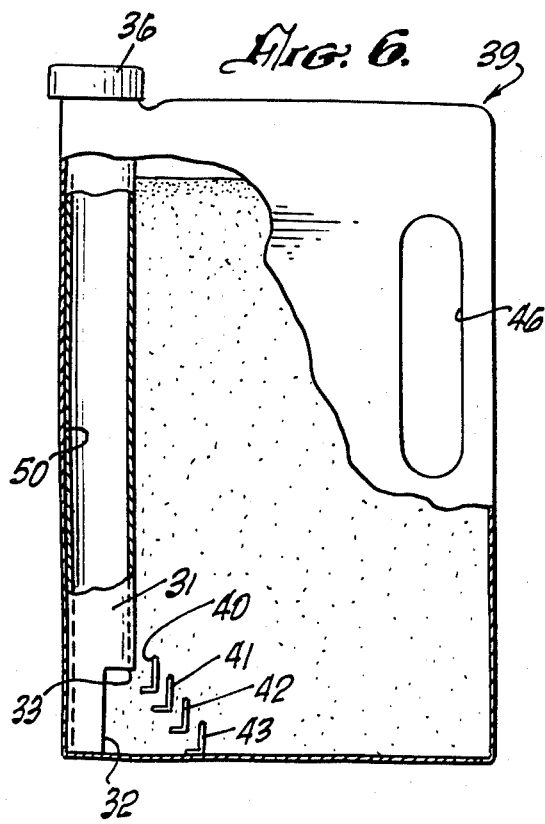
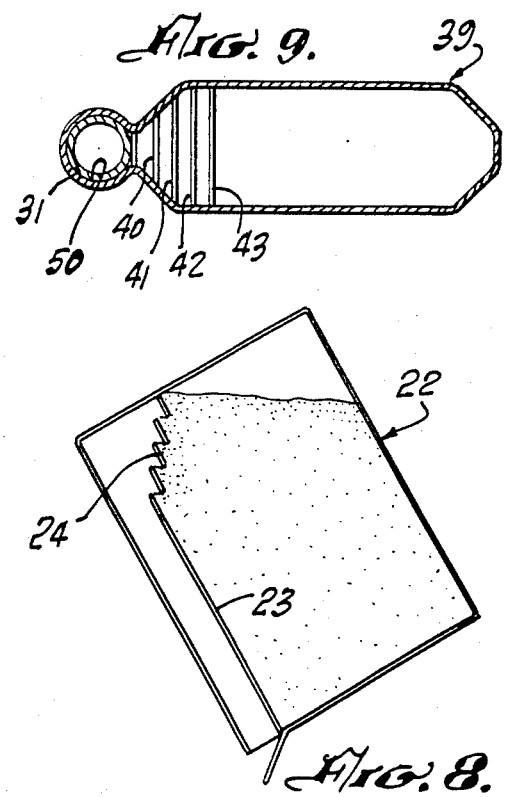

PARTITIONED BOX FOR POURING A MEASURED AMOUNT OF A GRANULATED SOLID

BACKGROUND OF THE INVENTION

The field of the invention is containers for granulated solids and the invention relates more particularly to containers capable of pouring a measured amount of a granulated solid each time the container is poured.

A container having partitions capable of causing a measured amount of a particulated solid to be poured from the container is shown in U.S. Pat. No. 3,298,576. Such container has two shortcomings. The first is that when the container is less than about one-third full, the measuring ability of the container is inaccurate and ineffective. Secondly, the first pour from such container creates a substantial overpour in that the pouring channel becomes filled as the container is shipped and moved about and, thus, the granulated solid in the pouring channel is greater than the desired measured amount.

SUMMARY OF THE INVENTION

It is an object of the present invention to provide a more accurate dispensing container for granulated solids which will not have a tendency to overpour on the first pour and will be accurate until almost all of the granulated solid has been poured from the container.

The present invention is for an improved partitioned box for pouring a measured amount of a granulated solid. The box has a bottom, a top, a front and a back and two end sides and a pouring spout at the top adjacent one of the end sides. The box has a plurality of ascending vertical partitions affixed across the interior of the box from the interior of the front to the interior of the back. The lowermost vertical partition begins at the bottom of the box and each vertical partition has a bottom and a top, the bottom of each vertical partition extending below the top of the adjacent lower partition and said ascending vertical partitions are about equally spaced from one another. A channel is formed between the interior of the front and back of the box beginning at the position of the bottom of a next vertical partition and extending generally upwardly toward the pouring spout whereby when said spout is directed downwardly, the quantity of granulated material within the space below the vertical partitions flows out of the spout, and when the box is returned to its upright position, granulated material flows downwardly into said space. A raised partition has a first end attached to the lowermost vertical partition and extends upwardly therefrom at least to about the vertical height of the beginning of the channel and having its second end spaced from said lowermost vertical partition a distance of at least about one-half of the distance from the lowermost vertical partition to the side of the box opposite the channel. The partition may be curved and terminate either on the bottom of the box or on the side of the box opposite the channel. If the partition is straight, it should angle upwardly and terminate on the side of the box opposite the channel. Hollow tube means may be positioned in the channel to keep granulated solid from entering the channel until the hollow tube means is moved. Preferably, the hollow tube means is a cylindrical tube and, preferably, the tube has an angled cut at the base thereof whereby turning of the tube opens a passageway between the granulated solid and the interior of the tube.

BRIEF DESCRIPTION OF THE DRAWINGS

FIG. 4 is a cross-sectional side view of an alternate embodiment including a rotatable pouring tube.

FIG. 5 is a side view, partly in cross-section, of the box of FIG. 4 with the pouring tube partly turned.

FIG. 6 is a cross-sectional side view of the box of FIG. 4 with the pouring tube turned to an open configuration.

FIG. 8 is a cross-sectional side view of a prior art box.

FIG. 9 is a cross-sectional view taken along line 9—9 of FIG. 5.

DESCRIPTION OF THE PREFERRED EMBODIMENTS

Figure 1:
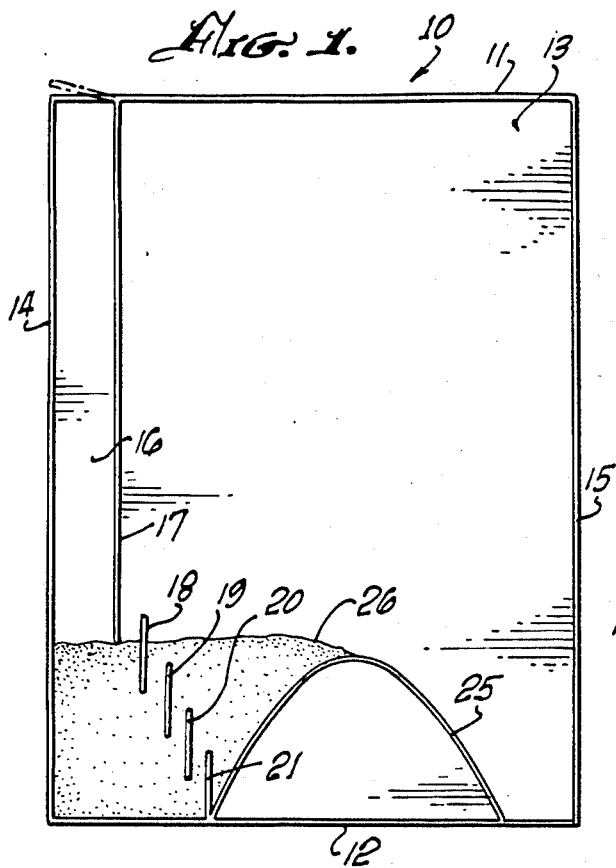
FIG. 1 is a cross-sectional side view of the improved partition box for pouring a measured amount of a granulated solid of the present invention.

The improved partitioned box for pouring a measured amount of a granulated solid is shown in cross-sectional side view in FIG. 1 and indicated generally by reference character 10. Box 10 has a top 11, a bottom 12, a front which is not shown and back 13. Box 10 has a pouring side 14 and a rear side 15. A channel 16 is formed by a vertical partition 17 which closes the channel in that partition 17 is affixed to both back 13 and the front which is not shown.

Box 10 has four vertical partitions 18 through 21. The top of each partition extends past the bottom of its adjacent higher partition and these partitions pour a measured amount as shown in FIG. 8 where the box is indicated by reference character 22. Box 22 has no bottom partition and when the granulated solid in box 22 reaches below the level of the partition 23, it can be readily understood that the area below partitions 24 will not be completely filled when the box is turned upright, thus causing a short pour.

Figure 2:
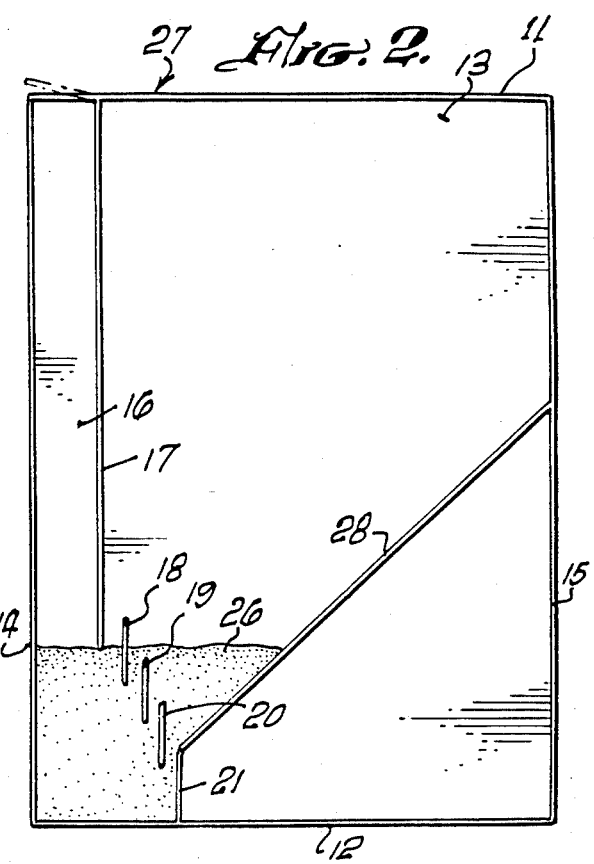
FIG. 2 is a cross-sectional side view of an alternate embodiment thereof.
Figure 3:
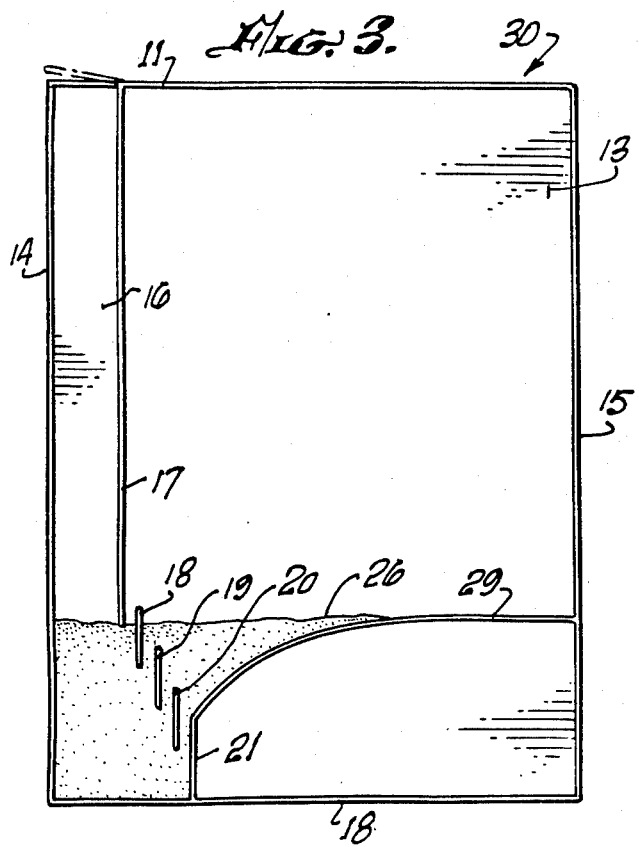
FIG. 3 is a cross-sectional side view of an alternate embodiment thereof.
Figure 7:
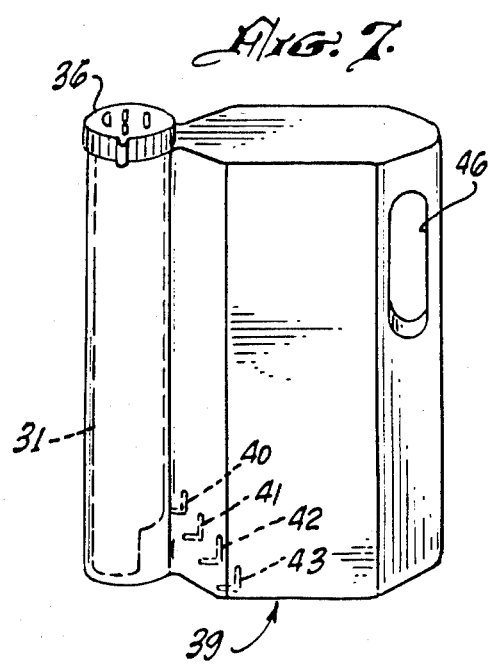
FIG. 7 is a perspective view of a blow-molded partitioned box of the present invention.

The problem of a short pour is solved to a large extent by the bottom partition 25 at the base of box 10. Even when the box is about ninety percent empty as indicated by the solids level 26 in FIG. 1, box 10 can still provide an accurate pour. The curved shape of bottom partition 25 allows the solids to move to the place shown in FIG. 1 as the box is tipped forward. It thus uses a minimum of space in the bottom of the box while still providing essentially complete pouring of measured solids. Box 27, shown in FIG. 2, has an alternate configuration of bottom partition 28 which is affixed to the bottom vertical partition 21 and also to rear side 15. Like the vertical partition 17, the bottom partition, such as partitions 25 and 28, reach entirely across the inner space between the front and back of the box. Similarly, partition 29 in box 30 reaches from bottom vertical partition 21 to rear side 15 and guides the granulated solid against the vertical partitions.

Another problem associated with the prior art box of U.S. Pat. No. 3,298,576 is its tendency to overpour on first use. This is caused by a filling of the area between partition 17 and pouring side 14 so that greater than the desired measured amount is available for pour. The boxes shown in FIGS. 4 through 7 eliminate this problem by the addition of a hollow tube means positioned in a molded partial cylinder to keep the granulated solid from entering the channel until the hollow tube means is moved. A preferred design of hollow tube is shown in FIGS. 4 through 7 where the hollow tube is a cylinder 31, having a right-angled cut 32 at the base thereof. The right-angled cut begins at the point indicated by reference character 33 which is about equal in height to the midpoint of uppermost partition 40.

FIG. 5 shows cylinder 31 as it is turned ninety degrees. Cylinder 31 may be readily turned by turning a knurled knob 36 at the top thereof. Preferably, a removable cap 37, not shown, is used to seal the box. As cylinder 31 is turned to its fully opened position, as shown in FIG. 6, the granulated solid can move downwardly through the spaces between partitions 40 through 43 and a measured amount, depending upon the volume below the partitions, is then poured when the box is poured. The cylinder 31 may then be left in an open position, as shown in FIG. 6, and measured amounts are poured until the box is almost completely empty.

Another type of measured pour may be obtained by turning cylinder 31 ninety degrees from its position in FIG. 6 to its position in FIG. 4. Since granulated soap has flowed into the base of the cylinder to a height about equal to the height 33, this amount of soap is captured by turning cylinder 31. This predetermined amount can then be poured out. Typically, a full cup is poured out when the cylinder 31 is in its open position of FIG. 6 and one-fourth of a cup poured out after the above-described turning stops. Thus, two separate and different measured pours may be obtained.

The preferred way of fabricating the box of the present invention is by blow molding where cylinder 31 can be held in a generally cylindrical-shaped opening 50, shown in FIG. 9, blow molded in the container. Similarly, the partitions analogous to partitions 40 through 43 can be formed in the blow molding process. A handle 46 is molded into the side of the container and is conventional.

The means by which the vertical partitions operate is described in applicant's co-pending application, Ser. No. 851,735, filed Apr. 14, 1986, as well as in U.S. Pat. No. 3,298,576. It is believed that a discussion of this measuring technique is not necessary for an understanding of the present invention. While the container of FIG. 7 does not show a bottom partition analogous to partition 25 of FIG. 1, such partition may be molded in the bottom of box 39 to assist in providing an accurate pour near the end of the use of the container.

The container of the present invention may be fabricated from conventional cardboard or from plastic. If from plastic, it may be injection molded or, preferably, blow molded. The preferred pouring amount of the box of the present invention is one cup although greater or lesser amounts may be used depending upon the size of the box and the placement of the bottom of the vertical partition. It is, of course, possible that the wall of cylinder 31 can function in place of the vertical partition.

The present embodiments of this invention are thus to be considered in all respects as illustrative and not restrictive: the scope of the invention being indicated by the appended claims rather than by the foregoing description. All changes which come within the meaning and range of equivalency of the claims are intended to be embraced therein.

What is claimed is:

1. An improved partitioned box for pouring a measured amount of a granulated solid, said box being of the type having a bottom, a top, a front and a back and two end sides and a pouring spout at the top adjacent one of the sides, said box further including:
   a plurality of ascending vertical partitions affixed across the interior of said box from the interior of the front to the interior of the back, the lowermost vertical partition beginning at the bottom of said box and each vertical partition having a bottom and a top, the bottom of each vertical partition extending below the top of the adjacent lower partition, said ascending vertical partitions being about equally spaced from one another;
   a channel formed between the interior of the front and back of the box beginning at the postion of the bottom of a next vertical partition and extending generally upwardly toward the pouring spout whereby when said spout is directed downwardly, the quantity of granulated material within the space below said vertical partitions flows out of said spout and when said box is returned to its upright position, granulated material flows downwardly into said space; and
   a raised partition having a first end attached to the lowermost vertical partition and extending upwardly therefrom at least to about the vertical height of the beginning of the channel and having its second end spaced from said lowermost vertical partition a distance at least about one half the distance from the lowermost vertical partition to the side of the box opposite the channel and wherein the raised partition is a curved partition and terminates on the bottom of the box.

2. The partitioned box of claim 1 wherein the space below said vertical partitions is about one cup.

3. An improved partitioned box for pouring a measured amount of a granulated solid, said box being of the type having a bottom, a top, a front and a back and two end sides and a pouring spout at the top adjacent one of the sides, said box further including:
   a plaurlity of ascending vertical partitions affixed across the interior of said box from the interior of the front to the interior of the back, the lowermost vertical partition beginning at the bottom of said box and each vertical partition having a bottom and a top, the bottom of each vertical partition extending below the top of the adjacent lower partition, said ascending vertical partitions being about equally spaced from one another;
   a channel formed between the interior of the front and back of the box beginning at the position of the bottom of a next vertical partition and extending generally upwardly toward the pouring spout whereby when said spout is directed downwardly, the quantity of granular material within the space below said vertical partitions flows out of said spout and when said box is returned to its upright position, granulated material flows downwardly into said space; and
   hollow tube means positioned in said channel to keep granulated solid from entering the channel until the hollow tube means is moved to eliminate an overpour when the box is first used wherein said channel is generally cylindrical in shape and said hollow tube is a generally cylindrical tube closely fitting within said channel, and wherein said generally cylindrical tube has an angled cut from about the mid-point of the bottom thereof extending upwardly a distance about equal to the height near the mid point of an uppermost vertical partition and downwardly to the bottom of the container so that when said tube is rotated, no granulated solid may enter the tube when the uncut side of the tube is facing the partitions, but when the tube is rotated so that the angled opening is facing the partitions, the granulated solid may enter the tube.

4. An improved partitioned box for pouring a measured amount of a granulated solid, said box being of the type having a bottom, a top, a front and a back and two end sides and a pouring spout at the top adjacent one of the sides, said box further including:
- a plurality of ascending vertical partititons affixed across the interior of said box from the interior of the front to the interior of the back, the lowermost vertical partition beginning at the bottom of said box and each vertical partition having a bottom and a top, the bottom of each vertical partition extending below the top of the adjacent lower partition, said ascending vertical partitions being about qually spaced from one another;
- a channel formed between the interior of the front and back of the box beginning at the position of the bottom of a next vertical partition and extending generally upwardly toward the pouring spout whereby when said spout is directed downwardly, the quantity of granulated material within the space below said vertical partitions flows out of said spout and when said box is returned to its upright position, granulated material flows downwardly into said space and
- a raised partition having a first end attached to the lowermost vertical partition and extending upwardly therefrom at least to about the vertical height of the beginning of the channel and having its second end spaced from said lowermost vertical partition a distance at least about one half the distance from the lowermost vertical partition to the side of the box opposite the channel and wherein the raised partition is a curved partition and terminates on the side of the box opposite the channel.

* * * * *